(12) United States Patent
Vallance et al.

(10) Patent No.: US 9,378,636 B2
(45) Date of Patent: Jun. 28, 2016

(54) FALL DETECTOR AND METHOD OF DETERMINING A FALL IN A SOCIAL ALARM SYSTEM

(71) Applicant: Tunstall Group Limited, North Yorkshire (GB)

(72) Inventors: Clive John Vallance, Leeds (GB); Richard James Farrell-Smith, Leeds (GB)

(73) Assignee: Tunstall Group Limited, North Yorkshire (GB)

( * ) Notice: Subject to any disclaimer, the term of this patent is extended or adjusted under 35 U.S.C. 154(b) by 232 days.

(21) Appl. No.: 14/072,834

(22) Filed: Nov. 6, 2013

(65) Prior Publication Data

US 2014/0132414 A1 May 15, 2014

(30) Foreign Application Priority Data

Nov. 9, 2012 (GB) ................ GB1220235.4

(51) Int. Cl.
*G08B 21/04* (2006.01)
*G01P 15/08* (2006.01)

(52) U.S. Cl.
CPC ........ *G08B 21/0446* (2013.01); *G01P 15/0891* (2013.01); *G08B 21/043* (2013.01)

(58) Field of Classification Search
CPC .............. G08B 21/0446; G08B 21/043; G01P 15/0891; A61B 5/1117; A61B 2562/0219
See application file for complete search history.

(56) References Cited

U.S. PATENT DOCUMENTS

| 2002/0118121 A1 | 8/2002 | Lehrman et al. |
| 2007/0055146 A1 | 3/2007 | Corlette et al. |
| 2008/0129518 A1 | 6/2008 | Carlton-Foss |
| 2009/0121863 A1 | 5/2009 | Prior |
| 2009/0209830 A1 | 8/2009 | Nagle et al. |
| 2010/0052896 A1 | 3/2010 | Goodman |
| 2012/0259577 A1 | 10/2012 | Ganyi |
| 2013/0054180 A1* | 2/2013 | Barfield ................ 702/138 |
| 2014/0052464 A1 | 2/2014 | Ray |
| 2014/0266705 A1 | 9/2014 | McKinley et al. |

FOREIGN PATENT DOCUMENTS

| DE | 102011004009 A1 | 8/2012 |
| EP | 2306420 A1 | 4/2011 |

* cited by examiner

*Primary Examiner* — James Yang
*Assistant Examiner* — Laura Nguyen
(74) *Attorney, Agent, or Firm* — Murphy, Bilak & Homiller, PLLC

(57) ABSTRACT

A fall detector unit is worn by a patient and performs a wakeup when an acceleration signal exceeds a predetermined threshold. A barometer provides a series of pressure readings over a pressure examination period to provide a first pressure difference value. The pressure signals are further monitored over a compensation period after the examination period to obtain a second pressure difference value representing background environmental changes. The first pressure difference value is compensated by the second pressure difference value to obtain a total pressure difference value and thus derive a total height difference value. The fall detector unit determines a fall event using the total height difference value.

20 Claims, 3 Drawing Sheets

FALL DETECTOR AND METHOD OF DETERMINING A FALL IN A SOCIAL ALARM SYSTEM

RELATED CASES

This application claims the benefit of application GB1220235.4 filed 9 Nov. 2012 in United Kingdom, the entire content of which is incorporated herein by reference.

BACKGROUND

1. Technical Field

The present invention relates in general to the field of social alarm systems and to a device for detecting a fall by a person.

2. Description of Related Art

Typically, a social alarm system monitors the safety and wellbeing of a client in their dwelling. A social alarm client unit is installed in the dwelling and is arranged to initiate an alarm call to a remote monitoring centre apparatus when an alarm event is detected. As particular examples, the alarm may be triggered by the client pressing an alarm button on the social alarm client unit itself or on a personal radio trigger unit such as pendant.

The client unit may use data signalling to inform the server apparatus of the alarm event. The remote monitoring centre apparatus may allow an operator using a terminal to open a voice communication path and talk with the client via the client unit. The voice communication path is helpful in order to immediately reassure the client and assess their need for further care.

The system may include a fall detector unit which is arranged to detect that the client has fallen and trigger a corresponding fall alarm event via the social alarm client unit. The fall detector may be carried or worn by the client, and may be provided in various configurations, such as a belt, a wrist strap, or a pendant, among others. As will be familiar to those skilled in the art, each of these wearing configurations brings forward technical challenges in order to correctly distinguishing a fall from other physical activities of the client (e.g. bending, sitting).

Thus, a difficulty arises in correctly and reliably detecting actual fall events. Also, it is desired to minimise false positives. Therefore, it is desired to provide an effective and cost-effective mechanism for detecting a fall by a fall detector unit in a social alarm system. In at least some situations, it is desired to provide a fall detector unit which is relatively small and lightweight, has good battery life (low power consumption), and yet which is robust and reliable.

Generally, it is desired to address one or more of the disadvantages associated with the related art, whether those disadvantages are specifically discussed herein or will be otherwise appreciated by the skilled person from reading the following description.

SUMMARY

According to the present invention there is provided an apparatus and method as set forth in the appended claims. Other features of the invention will be apparent from the dependent claims, and the description which follows.

In one example there is provided a social alarm system comprising a social alarm server apparatus and one or more social alarm client units connected thereto over a communications network. At least some of the client units are each associated with a fall detector unit. The social alarm client unit is configured to connect with the social alarm server apparatus over the communications network in response to an alarm event and to signal the social alarm server apparatus concerning the alarm event. The fall detector unit arranged to be carried by a user to detect a fall of the user. In other aspects there are provided a server apparatus, a client unit and/or a fall detector unit configured to be used in the system set forth herein.

In one example, a fall detector unit, wearable by a user, comprises an accelerometer and a barometer. The fall detector unit performs a wakeup when an acceleration signal exceeds a predetermined threshold. The barometer provides a series of pressure readings over a pressure examination period to provide a first pressure difference value. The pressure signals are further monitored over a compensation period after the examination period to obtain a second pressure difference value representing background environmental changes. The first pressure difference value is compensated by the second pressure difference value to obtain a total pressure difference value and thus derive a total height difference value. The fall detector unit determines a fall event using the total height difference value.

In one example there is provided a fall detector unit configured to be carried by a user, comprising a barometer arranged to measure atmospheric pressure to provide a pressure signal, and a controller which determines a fall event based at least on a compensated height difference by reading the pressure signal over a pressure examination period to derive a first pressure difference value, reading the pressure signal over a subsequent compensation period to derive a second pressure difference value, and modifying the first pressure difference value using the second pressure difference value.

In one example there is provided a method of detecting a fall, comprising providing a first series of pressure readings over a pressure examination period to provide a first pressure difference value; providing a second series of pressure readings over a pressure compensation period, after the pressure examination period, to provide a second pressure difference value; compensating the first pressure difference value based on the second pressure difference value to obtain a total pressure difference value; deriving a total height difference value based on the total pressure difference value; and detecting a fall event using the total height difference value.

In one example, the examination period lasts a predetermined period after detecting an acceleration signal greater than a wakeup threshold. In one example, the pressure signal is read periodically, suitably at regular intervals, to derive the series of pressure readings.

As will be discussed in more detail below, the example embodiments address many of the difficulties of the related art. These and other features and advantages will be appreciated further from the following example embodiments.

BRIEF DESCRIPTION OF THE DRAWINGS

For a better understanding of the invention, and to show how example embodiments may be carried into effect, reference will now be made to the accompanying drawings in which.

DETAILED DESCRIPTION

Figure 1:
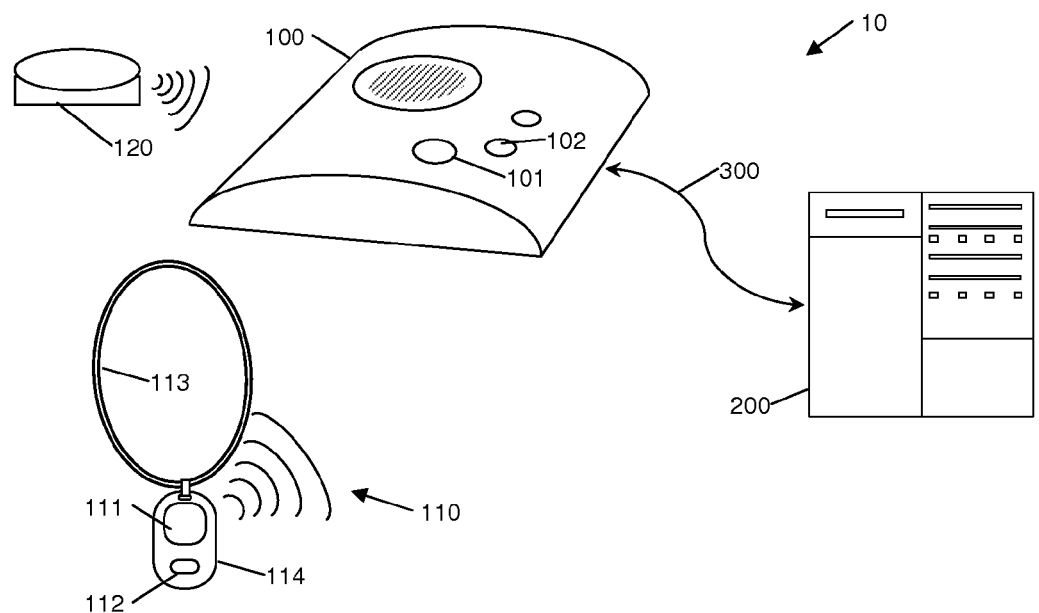
FIG. 1 is a schematic diagram of an example social alarm system.

The example embodiments will be described particularly with reference to the social alarm system shown in the drawings. The apparatus and method may be applied in many specific implementations, as will be apparent to persons skilled in the art from the teachings herein.

FIG. 1 is a schematic diagram showing an example social alarm system. In this example embodiment, the social alarm system 10 comprises a social alarm client unit 100 which is connected in use to social alarm server apparatus 200 at a remote monitoring centre through a communications channel 300. Suitably, the communications channel 300 is capable of carrying both voice signals and audio data signalling. The voice signals may be carried as an audio signal, and the data signalling may use in-band audio tones such as DTMF tones or other tones. The communications channel 300 suitably includes a telephone network. The telephone network may use land-lines (e.g. a plain old telephone systems POTS), cellular mobile telecommunications, or Voice-over-Internet Protocol (VoIP) communications.

As shown in FIG. 1, the example client unit 100 has a simple and straightforward user interface suitable for use by a wide range of people of differing abilities. Typically the client unit 100 includes, inter alia, a readily identified "alarm" button 101, so that the client may trigger an alarm event by manually pressing the alarm button on the client unit. The client unit may also include a "cancel" button 102, so that the client may cancel an unintentional alarm event, control the various functions of the client unit, or respond to verbal instructions provided by the care operator over the communications channel.

A fall detector unit 110 is configured to be worn or carried by the client. As examples, the fall detector unit 110 may be worn on the wrist or on a belt, or attached to a key ring, for example. In the example embodiments, the fall detector unit 110 is provided as a pendant worn around the neck of the client with a lanyard 113 supporting a main housing 114. In use, the housing 114 rests on the client's chest, suitably at or about their breastbone. In this configuration, the fall detector unit 110 is well placed to monitor and detect a fall event, while being relatively comfortable and unobtrusive for the client.

The fall detector unit 110 may also provide a personal radio trigger function, by incorporating an alarm button 111 so that the user may manually raise an alarm call even when they are not in close proximity to the client unit 100. The unit 110 may also include a cancel button 112 which, similar to the cancel button 102 on the client unit, may be used to cancel an unintentional alarm event.

The fall detector unit 110 is coupled to the client unit 100 by any suitable form of wireless communication. In one example embodiment, the fall detector unit 110 communicates with the client unit 100 over a short range wireless radio transmission, e.g. using an EN300 220-2: 2010 Category 1 radio receiver or radio transceiver.

In the example embodiment, the client unit 100 may also be coupled to one or more remote sensors 120. These sensors 120 may be provided at suitable locations around the dwelling of the client in order to monitor the daily activities of the client. The sensors 120 may include any suitable telecare sensor or combination of sensors. The remote sensors 120 may include bed/chair occupancy sensors, pressure mats, and/or environmental sensors (e.g. carbon monoxide, natural gas), amongst others. Suitably, the sensors 120 communicate with the client unit 100 over short-range wireless radio transmission, or may be wired to the client unit 100.

The client unit 100 may thus raise various types of alarm events and signal these alarm events to the server apparatus 200, based on the activity of the client as monitored by the fall detector unit 110 and the remote sensors 120. Typically, the client unit 100 is configured to initiate an outgoing telephone call by seizing the telephone line (going off-hook) and dialling a pre-programmed telephone number of the remote monitoring centre where the server 200 is located. The server 200 answers the call and an audio path is established. Audio data signalling (e.g. DTMF or other tones) allows the client unit 100 to exchange data messages with the server 200 which notify the server 200 of (a) a serial number or identity of the client unit 100 making the call, and (b) the nature of the triggering event giving rise to the call. In response, the server 200 may log the call and transfer control of the telephone line to an operator, who may then speak to the client via the client unit 100.

Figure 2:
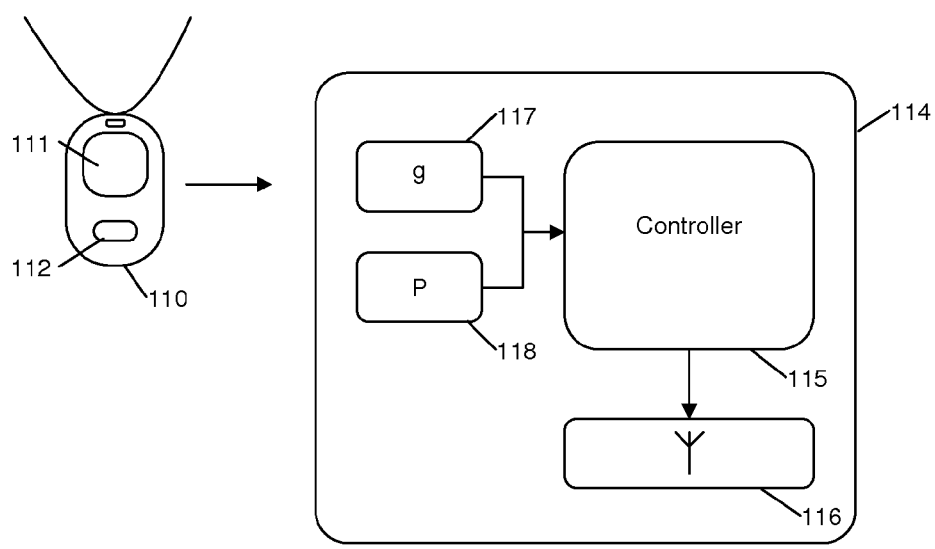
FIG. 2 is a schematic diagram showing an example internal configuration of a fall detector unit.

FIG. 2 is a schematic diagram showing an example internal configuration of the fall detector unit 110, in this example including a controller 115, a communication module 116, an accelerometer 117 and a barometer 118. As noted above, one or more buttons may be provided externally on the main housing 114, such an alarm button 111 and a cancel button 112.

The accelerometer 117 generates the acceleration signal g, which is conveniently a three-axis acceleration signal having x, y & z orthogonal axes. The acceleration signal may be provided as an acceleration vector. The controller 115 may collect the acceleration signal at regular intervals, e.g. at 50, 100 or 200 times per second, and provide a temporary store or buffer for the acceleration signal over a period of interest which is sufficient to examine a potential fall event. Typically, this examination period lasts less than one minute and in example embodiments may be in the range of 10 to 30 seconds.

The barometer 118 provides a pressure signal P based on atmospheric pressure in the vicinity of the fall detector unit 110. The pressure signal is likewise collected by the controller 115 at regular intervals and stored in a pressure signal buffer. The buffer stores the pressure signal for a sufficient time period to examine a potential fall event, such as of the order of 10 to 30 seconds in length, with the pressure sensor 118 measuring at intervals of about 1 to 10 Hz. Conveniently, the pressure examination period is of the same order as the acceleration examination period, typically being less than one minute and suitably about 10, 20 or 30 seconds.

Where the controller 115 determines that the magnitude of the acceleration signal, i.e. the magnitude of the acceleration vector, has exceeded a preset shock threshold (or 'wakeup' threshold), then the controller 115 moves from a quiescent state to an examining state. In the examining state, the controller 115 examines the acceleration signal to determine whether or not a fall event has been detected. In the example embodiments, the controller 115 determines either a fall-event or a non-fall event by examining both the pressure and acceleration signals during selected examination time periods after the shock threshold was exceeded.

In one example embodiment, the controller 115 determines a fall event by considering a change in angle of the acceleration vector between first and second time points, e.g. a first vector at time t=0 seconds and a second vector at a later time t=X seconds, where t=0 is the time at which the magnitude of the acceleration vector first exceeded the shock threshold or wakeup threshold. In example embodiments, X is of the order of 1 second, such as between about 500 milliseconds and 1.5 seconds or similar. A small change in angle would be consistent with an accidental knock or bump against the fall detector unit 110 and thus is not determined as a fall event (i.e. this event is instead classified as being a non-fall event). However, a large change in angle would be consistent with a fall, such as where the user topples forward or slumps backwards, or collapses to the floor and possibly rolls over, each of these movements causing a relatively large change in the orientation of the fall detector unit, which is thus confirmed as a fall event. Hence, the controller 115 examines the acceleration signal responsive to exceeding the wakeup threshold as part of the process to classify this event as being one of a fall event and a non-fall event.

In the example embodiments, the pressure signal P from the barometer 118 is used to indicate a relative change in height of the fall detector 110 during an examined event. The change in pressure within the monitored period of interest is used by the controller 115 to further inform and determine whether a fall event or non-fall event has occurred. For example, a change in pressure indicating a change in height of more than a predetermined amount, say 1 meter, would be consistent with a fall event, whilst a relatively constant pressure and thus constant height would indicate a non-fall event.

Figure 3:
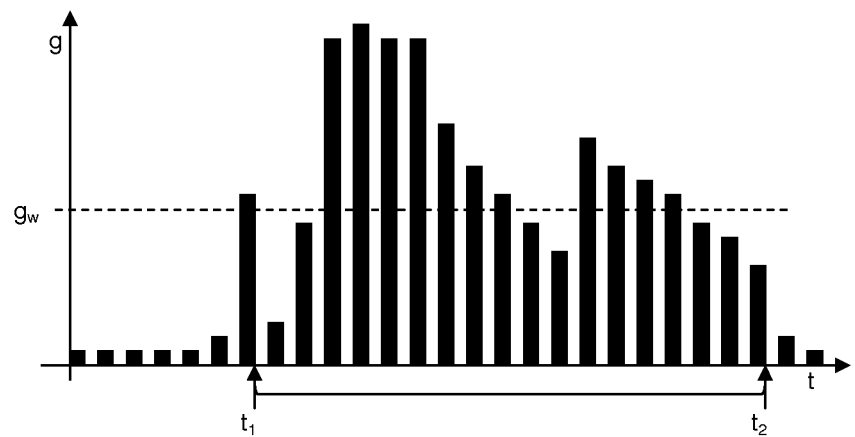
FIG. 3 is a graph showing an example acceleration signal over time.

FIG. 3 is a graph as an illustrative example of the acceleration signal g over a time period t. The graph shows a wake-up point at a time $t_1$ when the magnitude of the acceleration signal exceeds the wakeup threshold $g_w$, followed by an examination period until time $t_2$. As noted above, the controller 115 examines the acceleration signal g during the acceleration examination period as part of the process to determine a fall or non-fall outcome of this examined event.

Figure 4:
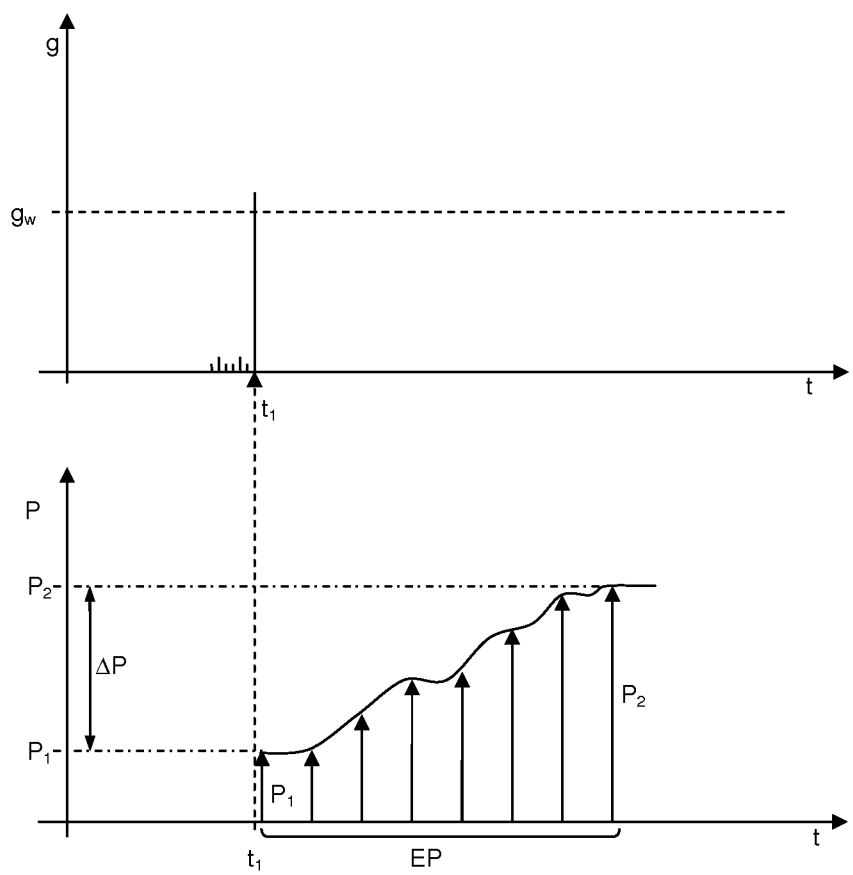
FIG. 4 is a graph showing an example acceleration signal and an example pressure signal over time.

FIG. 4 is a graph showing a relationship between the acceleration signal and the pressure signal. As noted above, the controller 115 determines at time $t_1$ that the acceleration signal g exceeds the wakeup threshold $g_w$. As a result, the controller 115 now also considers the pressure signal P from the barometer 118. In the example embodiments, the acceleration readings are dealt with separately, as discussed above, and hence are not shown in detail in FIG. 4.

In this practical example, the acceleration signal is captured many times each second, e.g. at about 100 Hz, whilst the pressure signal is captured with longer intervals such as about once every second, i.e. about 1-10 Hz. Hence, there may be a delay from the wakeup time $t_1$ until the next pressure signal reading. The pressure signal is then monitored at each interval over an examination period EP which, as discussed above, is suitably of the order of 10-20 seconds. This examination period is longer than the time period normally of interest in a fall event, so that the fall event may start and finish within the examination period EP in normal circumstances. Typically, a person who experiences a fall will come to rest relatively quickly (e.g. lying on the ground), say with about 0.5 to 1.5 seconds. However, in practice people do not always fall directly from a standing position to a prone position and thus the examination period EP allows the fall detector to be more accurate over a wider range of practical conditions.

As shown in FIG. 4, the pressure signal P from the barometer 118 is captured at regular intervals to produce a sequence of pressure readings. In the example embodiment, an initial pressure reading $P_1$ is recorded in relation to the beginning of the examination period EP and a final pressure reading $P_2$ is recorded in relation to the end of the examination period. The difference between these two pressure readings $\Delta P$ thus represents a change in height of the fall detector unit 110.

In other example embodiments, the initial pressure reading $P_1$ may be recorded as a one of the pressure readings, or as a local average, within a first portion of the examination period. Conversely, the final pressure reading $P_2$ may be determined as a significant one of the readings, or as a local average, within a later second portion of the examination period. The individual pressure readings may be combined to produce one or more combined or blended pressure readings, such as a rolling average pressure reading, and the maximum and minimum pressure values may be determined from these further processed pressure readings.

A difficulty arises in that the variation in detected pressure is caused not only by the change in height of the barometer 118 within fall detector unit 110 worn by the user, but may also be caused by changes in ambient atmospheric pressure in the vicinity of the fall detector unit. That is, environmental factors such as opening a door, or turning on an air conditioning unit, may also change the pressure reading. In the example embodiments, the barometer 118 is relatively sensitive and is capable of detecting pressure changes of less than one microbars ($10^{-6}$ bar). Thus, there is a desire to also consider environmental pressure changes in addition to height-related pressure changes.

Figure 5:
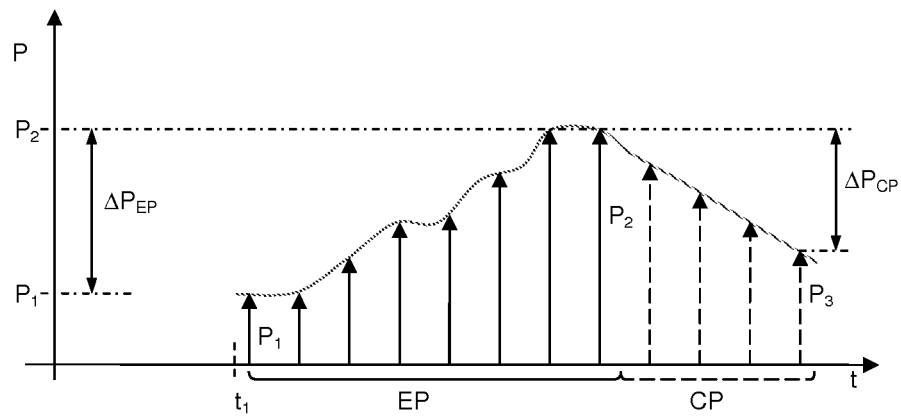
FIG. 5 is a graph showing an example pressure signal over time.

FIG. 5 is a graph illustrating the example embodiment of the fall detector unit 110 in more detail with respect to the pressure signal readings from the barometer 118. As shown in FIG. 5, the examination time period EP is followed by a compensation time period CP, where a further series of pressure readings are captured. In this illustrated example, 8 pressure readings have been captured during the examination period, and 4 further readings are captured during the compensation period.

Surprisingly, these additional readings of the compensation period provide very useful additional information. In particular, in a fall event the patient will typically line prone and thus remain relatively stationary at least during the compensation period. Hence, the changes in the pressure reading during the compensation period are most likely not due to a change in height of the fall detector unit. Instead, this change in the pressure reading most likely represents changes due to environmental factors in the vicinity of the fall detector unit.

In the example embodiments, the pressure readings during the compensation period are captured and a final compensating pressure reading $P_3$ is obtained. As noted above, the compensating pressure reading $P_3$ may be taken as the final pressure reading in the series of readings. In other embodiments $P_3$ may be the highest/lowest pressure reading observed during the compensation period, or may be a local maximum/minimum at least during a predetermined portion of the compensation period. An average may be taken of one or more of the pressure readings to obtain the final compensating pressure reading $P_3$.

In the example embodiments, the controller 115 calculates a pressure difference $\Delta P_{CP}$ relating to the compensation period CP. In this example, the pressure difference is calculated between the final pressure reading $P_2$ at the end of the examination period and the final compensating pressure reading $P_3$ at the end of the compensation period. As shown in FIG. 5, the controller 115 thus obtains a first pressure difference value $\Delta P_{EP}$ from the pressure readings during the examination period, and obtains a second pressure difference value $\Delta P_{CP}$ from the pressure readings during the compensation period. In this example the compensation period is subsequent to and follows directly after the examination period. In further alternate embodiments, the compensation period begin after the end of the examination period, e.g. being separated by a gap such as one or more pressure reading intervals.

In a further example embodiment, the pressure difference $\Delta P_{CP}$ for the compensation period may be obtained using a first compensating pressure reading at the beginning of the compensation period compared with the final reading at the end of the compensation period. The compensating pressure readings may themselves be independent of any of the pressure readings taken in the examination period.

The controller 115 calculates a compensated pressure difference by considering the first pressure difference $\Delta P_{EP}$ and the second pressure difference $\Delta P_{CP}$. In the situation illustrated in FIG. 5, the total height difference $\Delta H$ is calculated based on the total compensated pressure difference $\Delta P_{TOTAL} = \Delta P_{EP} + \Delta P_{CP}$, because the change in pressure during the compensation period in this case indicates a background environmental pressure change which is reducing. Conversely, in the situation where the pressure increases during the compensation period, then the effective height difference $\Delta H$ is based on the examined pressure difference $\Delta P_{EP}$ minus the compensated pressure difference $\Delta P_{CP}$, because in this situation the compensation period has revealed a background trend of increasing pressure.

The graph of FIG. 5 is not to scale and is purely illustrative of the general principles for persons skilled in the art. Also, it will be appreciated that environmental pressure changes are complex and not necessarily linear trends. However, by considering a relatively short compensation period of the order of the examination period or shorter than the examination period, a short-term approximation of the complex environmental background trends can be considered, sufficient to correct and compensate for environmental variations over the time period of interest in relation to this fall event. In other words, tracking pressure changes over a relatively long period, i.e. several minutes, tends to reveal a relatively complex situation, whilst looking specifically at a relatively short compensation period actually provides a more appropriate approximation in practical embodiments.

Figure 6:
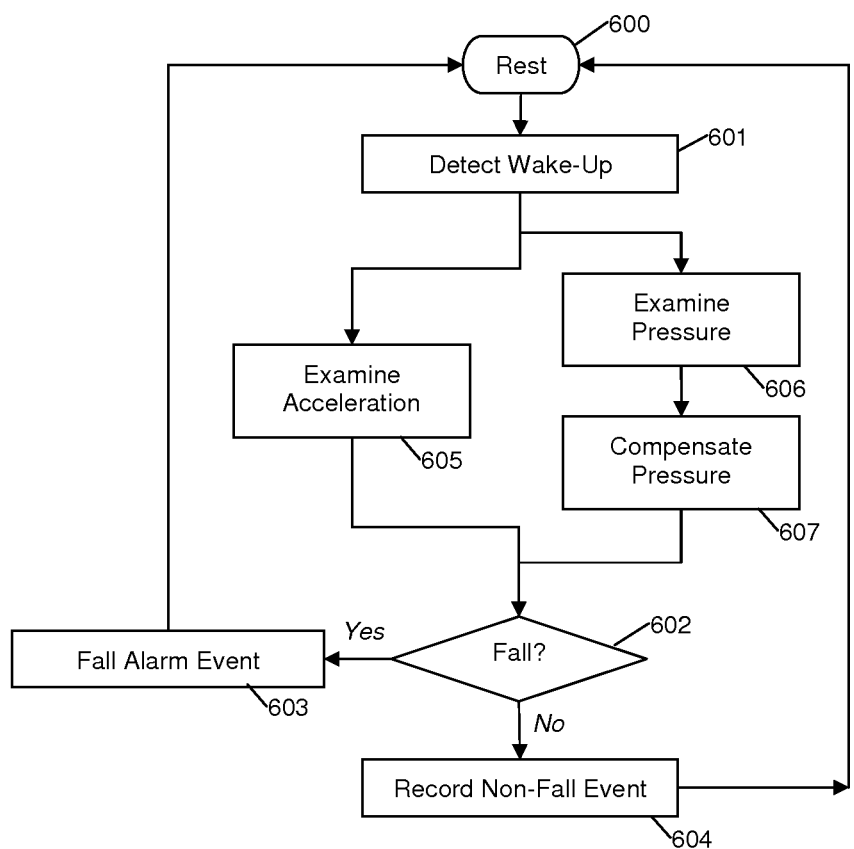
FIG. 6 is a schematic flowchart of an example method of detecting a fall by a fall detector unit in a social alarm system.

FIG. 6 is a flow chart illustrating an example method of detecting a fall, which is suitably performed within the fall detector unit 110. However, in some example embodiments, one or more of the steps may be performed by a processing unit in the client unit 100, in cooperation with the fall detector unit 110. That is, the method allows for distributed processing, with some form of intermediate results (e.g. the pressure values $P_1, P_2$, etc) being transmitted from the fall detector unit 110 to the client unit 100, and then performing a remaining portion of the method in the client unit 100 leading to a conclusion that a fall has, or has not, occurred.

The method suitably comprises monitoring the acceleration signal at least periodically when in a resting state, at step 600. A wakeup condition is detected at step 601, suitably when the magnitude of the acceleration signalling exceeds the wakeup threshold. Step 602 involves examining the signals received by the fall detector 110 to decide a fall event or a non-fall event, including particularly examining the acceleration signal and the pressure signal as noted above. Where a fall event is determined, then a fall alarm signal is suitably generated at step 603. A non-fall event is optionally recorded at step 604. The method may then return to the resting state of step 600 ready for a next wake-up event.

As shown in FIG. 6, the method of the example embodiment includes the step 605 of examining the series of acceleration signals over the acceleration examination period as described above. Further, the method includes examining a series of pressure readings over the pressure examination period as described above, as in step 606. Further, the method includes the step 607 of compensating the measured pressure difference obtained from the step 606 by performing a further series of pressure readings and obtaining a second pressure difference, and modifying the first pressure difference according to the second pressure difference in step 607, as explained in more detail above.

In the example embodiments, the controller 115 is carried within the housing of the fall detector 110 and operates from a battery power source. Hence, considering the target user group, it is desired to have relatively long battery life and relatively low power consumption. Also, it is desired that the controller 115 should be relatively simple and inexpensive, whilst still producing accurate results. Hence, in this context, providing the compensation period in addition to the examination period allows a more accurate determination of the actual change in height, but without significantly increasing power consumption or complexity within the fall detector unit 110. Notably, the example embodiments provide pressure compensation within the fall detector unit 110 as a standalone unit, i.e. without referring to any other pressure sensor located elsewhere.

In normal use, it is to be expected that the acceleration signal will exceed the wakeup threshold at least once per day, and more commonly between about five and about ten times per day, in response to the ordinary daily living activities of the user. Hence, it is expected that the fall detector unit 110 has to perform the fall detection function accurately and reliable each time while minimising false positives.

The industrial application of the present invention will be clear from the discussion above. Likewise, the many advantages of the invention will be apparent from these embodiments and/or from practicing the example embodiments of the invention.

Although a few preferred embodiments have been shown and described, it will be appreciated by those skilled in the art that various changes and modifications might be made without departing from the scope of the invention, as defined in the appended claims.

The invention claimed is:

1. A social alarm system, comprising:
  a social alarm server apparatus;
  a social alarm client unit which is configured to connect with the social alarm server apparatus over a communications network in response to an alarm event and to signal the social alarm server apparatus concerning the alarm event;
  a fall detector unit, arranged to be carried by a user, comprising an accelerometer arranged to measure acceleration forces to provide an acceleration signal and a barometer arranged to measure atmospheric pressure to provide a pressure signal;
  a controller which, upon the acceleration signal exceeding a wake-up threshold, is arranged to determine whether or not a fall event has occurred based on the acceleration signal and the pressure signal; and
  an alarm signal unit which is arranged to generate a fall alarm signal in response to the controller determining that the fall event has occurred;
  wherein the controller is arranged to determine a compensated height difference for determining the fall event by:
    reading the pressure signal over a pressure examination period to derive a first pressure difference value, wherein the first pressure difference value is determined by taking a difference between at least two readings from the pressure signal in the examination period, reading the pressure signal over a subsequent compensation period to derive a second pressure difference value, wherein the second pressure difference value is determined by taking a difference between at least one pressure reading of the pressure signal in the compensation period and at least one other pressure reading of the pressure signal in the examination period or in the compensation period, and modifying the first pressure difference value using the second pressure difference value.

2. The system of claim 1, wherein the controller is arranged to record a first pressure reading in relation to a beginning of the examination period and a second pressure reading in relation to an end of the examination period, and obtain the first pressure difference value with respect to the first and second pressure readings.

3. The system of claim 2, wherein the first pressure reading is obtained from one of a plurality of readings of the pressure signal within a first portion of the examination period and the second pressure reading is one of a plurality of readings of the pressure signal within a second portion of the examination period, wherein the second portion is later in time than the first portion.

4. The system of claim 3, wherein the controller is arranged to record at least a third pressure reading obtained from the pressure signal during the compensation period.

5. The system of claim 4, wherein the compensated height difference is calculated according to a difference between the second pressure reading at the end of the examination period and the third pressure reading in the compensation period.

6. The system of claim 5, wherein the third pressure reading relates to a final part of the compensation period.

7. The system of claim 5, wherein the third pressure reading is a highest or lowest pressure observed by reading the pressure signal during the compensation period.

8. The system of claim 1, wherein the compensation period is subsequent to and follows directly after the examination period.

9. The system of claim 1, wherein the controller calculates a compensated pressure difference value by adding the first pressure difference value and the second pressure difference value.

10. The system of claim 1, wherein the controller reads the pressure signal at regular time intervals and stores each pressure reading in a buffer.

11. The system of claim 10, wherein the buffer stores the pressure readings over a total period of at least 10 seconds.

12. The system of claim 1, wherein the compensation period represents a time period in which changes in pressure due to environmental factors in the vicinity of the fall detector unit may occur.

13. A fall detector unit configured to be carried by a user, comprising:
an accelerometer arranged to measure acceleration forces to provide an acceleration signal;
a barometer arranged to measure atmospheric pressure to provide a pressure signal;
a controller which, upon the acceleration signal exceeding a wake-up threshold, is arranged to determine a fall event based on the acceleration signal and the pressure signal; and
wherein the controller is arranged to determine a compensated height difference for determining the fall event by:
reading the pressure signal over a pressure examination period to derive a first pressure difference value, wherein the first pressure difference value is determined by taking a difference between at least two readings from the pressure signal in the examination period,
reading the pressure signal over a subsequent compensation period to derive a second pressure difference value, wherein the second pressure difference value is determined by taking a difference between at least one pressure reading of the pressure signal in the compensation period and at least one other pressure reading of the pressure signal in the examination period or in the compensation period, and
modifying the first pressure difference value using the second pressure difference value.

14. The fall detector unit of claim 13, wherein the controller is arranged to record a first pressure reading in relation to a beginning of the examination period and a second pressure reading in relation to an end of the examination period, and obtain the first pressure difference value with respect to the first and second pressure readings.

15. The fall detector unit of claim 14, wherein the first pressure reading is obtained from one of a plurality of readings of the pressure signal within a first portion of the examination period and the second pressure reading is one of a plurality of readings of the pressure signal within a second portion of the examination period, wherein the second portion is later in time than the first portion.

16. The fall detector unit of claim 15, wherein the controller is arranged to record at least a third pressure reading obtained from the pressure signal during the compensation period, and to calculate the compensated height difference according to a difference between the second pressure reading obtained at the end of the examination period and the third pressure reading obtained during the compensation period.

17. A method of detecting a fall by a fall detector unit, comprising:
monitoring an acceleration signal of the fall detector unit;
detecting a wakeup event upon a magnitude of the acceleration signal exceeding a wakeup threshold;
providing a first series of pressure readings over a pressure examination period to provide a first pressure difference value, wherein the first pressure difference value is determined by taking a difference between at least two readings of a pressure signal in the examination period;
providing a second series of pressure readings over a pressure compensation period, after the pressure examination period, to provide a second pressure difference value, wherein the second pressure difference value is determined by taking a difference between at least one pressure reading of the pressure signal in the compensation period and at least one other pressure reading of the pressure signal in the examination period or in the compensation period;
compensating the first pressure difference value based on the second pressure difference value to obtain a total pressure difference value;
deriving a total height difference value based on the total pressure difference value;
detecting a fall event using the total height difference value; and
outputting a fall detection signal in response to detecting the fall event.

18. The method of claim 17, comprising recording at least a first pressure reading in relation to a beginning of the examination period and a second pressure reading in relation to an end of the examination period, and obtaining the first pressure difference value with respect to the first and second pressure readings.

19. The method of claim 18, wherein the first pressure reading is obtained from one of a plurality of readings of the pressure signal within a first portion of the examination period and the second pressure reading is one of a plurality of readings of the pressure signal within a second portion of the examination period, wherein the second portion is later in time than the first portion.

20. The method of claim 19, comprising recording at least a third pressure reading obtained from the pressure signal during the compensation period, and calculating the second pressure difference value between the second pressure reading obtained at the end of the examination period and the third pressure reading obtained during the compensation period.

* * * * *